United States Patent

Yamamura

[11] Patent Number: 5,226,140
[45] Date of Patent: Jul. 6, 1993

[54] APPARATUS FOR CONTROLLING THE TRANSFER OF DATA

[75] Inventor: Kimio Yamamura, Tokyo, Japan

[73] Assignee: Hudson Soft Co., Ltd., Hokkaido, Japan

[21] Appl. No.: 663,058

[22] Filed: Feb. 27, 1991

Related U.S. Application Data

[63] Continuation of Ser. No. 245,112, Sep. 15, 1988, abandoned.

[30] Foreign Application Priority Data

Sep. 19, 1987 [JP] Japan ................. 62-235487

[51] Int. Cl.⁵ .............. G06F 12/00; G06F 13/00
[52] U.S. Cl. .................. 395/425; 364/238.4; 364/244.7; 364/260.3; 364/DIG. 1; 395/325
[58] Field of Search .............. 395/800, 425, 775

[56] References Cited

U.S. PATENT DOCUMENTS

| | | | |
|---|---|---|---|
| 4,642,789 | 2/1987 | Lavelle | 364/900 |
| 4,646,230 | 2/1987 | Eguchi | 364/200 |
| 4,755,937 | 7/1988 | Glier | 395/425 |

Primary Examiner—Parshotam S. Lall
Assistant Examiner—Ayni Mohamed
Attorney, Agent, or Firm—Lowe, Price, LeBlanc & Becker

[57] ABSTRACT

An apparatus for controlling the transfer of data comprises registers for setting an address of a memory and data to be stored in the memory at the address, and a control unit for controlling the registers to set the address and data. In a case where an immediate data transfer command is produced, a physical address is defined by including the immediate data transfer command partly therein. The physical address thus defined is automatically set in the register for setting an address of a memory without receiving an address setting command so that the data stored in the register for setting data are written into the memory at the physical address.

2 Claims, 7 Drawing Sheets

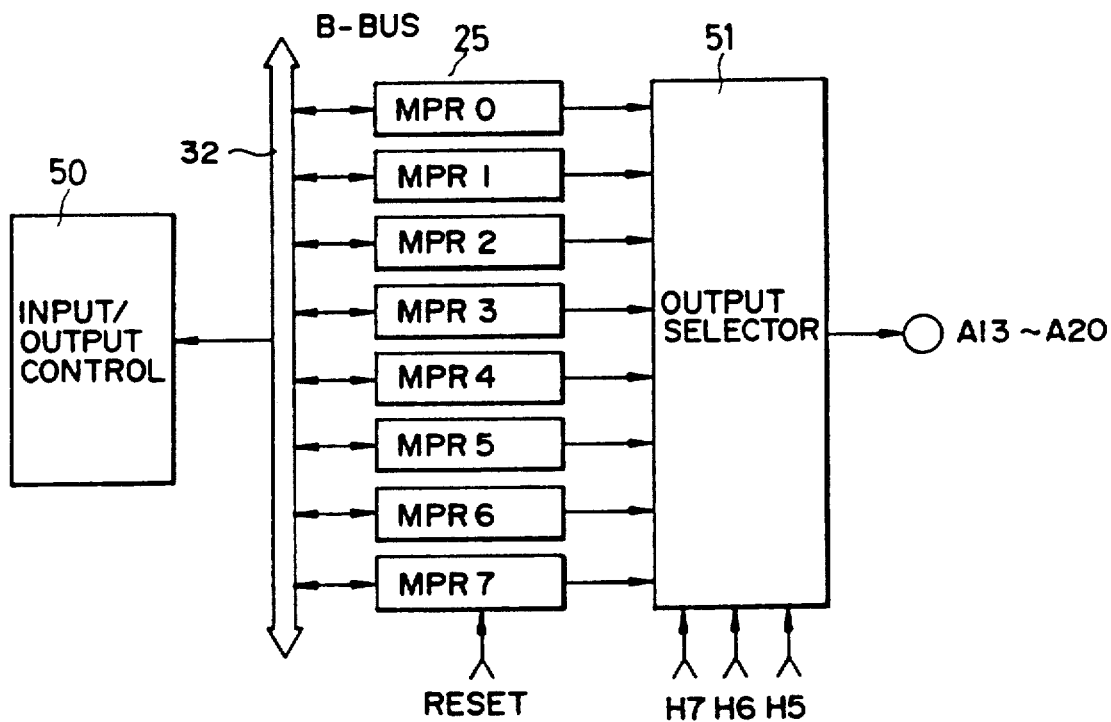

FIG.5

| MAPPING REGISTER | LOWER BYTE (BINARY) MSB        LSB |
|---|---|
| MPR0 | 00000001 |
| MPR1 | 00000010 |
| MPR2 | 00000100 |
| MPR3 | 00001000 |
| MPR4 | 00010000 |
| MPR5 | 00100000 |
| MPR6 | 01000000 |
| MPR7 | 10000000 |

FIG.6

| IR \ ADDRESS | A1 | A0 |
|---|---|---|
| ST0 | 0 | 0 |
| ST1 | 1 | 0 |
| ST2 | 1 | 1 |

APPARATUS FOR CONTROLLING THE TRANSFER OF DATA

This application is a continuation application of application Ser. No. 07/245,112, filed Sep. 15, 1988 now abandoned.

FIELD OF THE INVENTION

The invention relates to an apparatus for controlling the transfer of data, and more particularly to an apparatus for controlling the transfer of data in which data are transferred in accordance with a single data transfer command.

BACKGROUND OF THE INVENTION

A conventional apparatus for controlling the transfer of data comprises a first register in which a write-address of a memory is set, and a second register in which write-data are set.

In operation, when respective commands for the first and second registers are supplied from a CPU thereto, a write-address is set in the first register, and write-data are set in the second register so that the write-data are stored in a memory.

In the conventional apparatus for controlling the transfer of data, however, the transfer of data can not be smoothly performed when a large amount of data are transferred because a write address and write-data are set in the respective registers in accordance with the respective commands.

SUMMARY OF THE INVENTION

Accordingly, it is an object of the invention to provide an apparatus for controlling the transfer of data in which the transfer of data can be smoothly performed even in a case where a large amount of data are transferred.

It is a further object of the invention to provide an apparatus for controlling the transfer of data in which a write-address is not required to be set in an address register in accordance with an address setting command.

According to the invention, an apparatus for controlling the transfer of data comprises a set of registers and a control unit. The set of registers includes a memory address write register for setting a write-address and a VRAM data write register for setting write-data. When an immediate transfer command is produced, the write-data are transferred to an address of a memory determined in accordance with the command under the control of the control circuit.

BRIEF DESCRIPTION OF THE DRAWINGS

The invention will be described in more detail in conjunction with appended drawings wherein, FIG. 3 is a block diagram showing a mapping register circuit in an apparatus for controlling the transfer of data in the embodiment, FIG. 4 is an explanatory diagram showing a mapping register selection code when a physical address is produced in an apparatus for controlling the transfer of data in the embodiment, FIG. 5 is an explanatory diagram showing a mapping register selection code when data are read from a mapping register and written thereinto in an apparatus for controlling the transfer of data in the embodiment, FIG. 6 is an explanatory diagram showing an immediate transfer code for a video display controller in the apparatus for displaying a color image.

DESCRIPTION OF THE PREFERRED EMBODIMENTS

Figure 1:
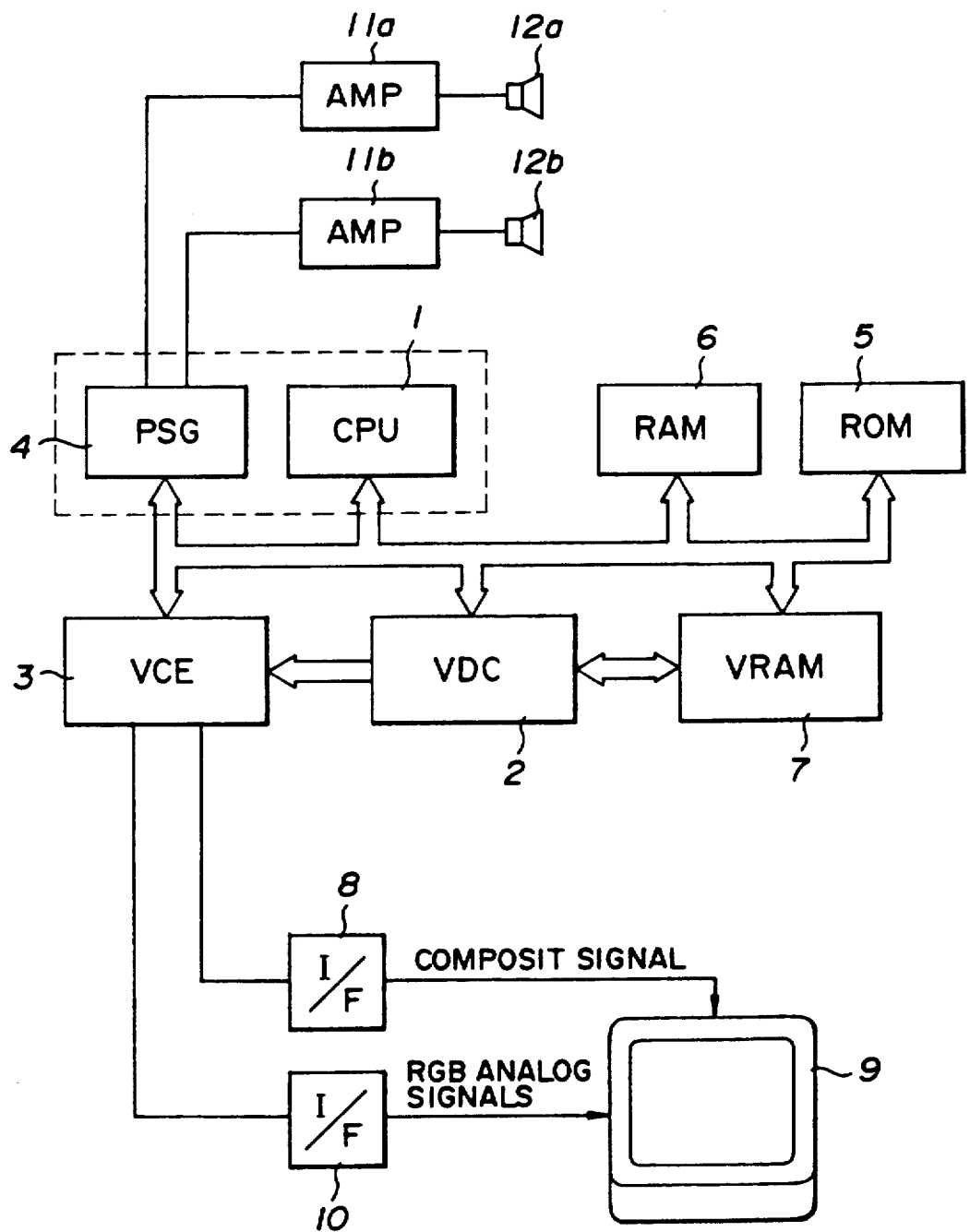
FIG. 1 is a block diagram showing an apparatus for displaying a color image in which an apparatus for controlling the transfer of data is included.

In FIG. 1, there is shown an apparatus for displaying a color image to which an apparatus for controlling the transfer of data according to the invention is applied. In the apparatus for controlling the transfer of data, a CPU 1 performs a predetermined control in accordance with a program stored in ROM 5 so that data, arithmetical results etc. are stored into a RAM 6 temporarily. A video display controller 2 is provided therein to supply a video color encoder 3 with video data of a story, for instance, for a so-called television game read from a video RAM (VRAM) 7 in accordance with a control of the CPU 1 which deciphers a program for the television game stored in the ROM 5. The video color encoder 3 to which the video data are supplied produces RGB analog signals obtained in accordance with color data stored therein, or produces video color signal including a luminance signal and color difference signals obtained in accordance with the color data. Further, a programable sound generator 4 is provided therein to produce analog sound signals as left and right stereo sounds in accordance with a content of the ROM 5 which is supplied through the CPU 1 thereto. The video color signal produced in the video color encoder 3 is supplied through an interface 8 to a receiving circuit of a television set 9 as a composite signal, and the RGB analog signal is supplied through an interface 10 directly to a CRT of the television set 9 which functions as an exclusive use monitor means. On the other hand, the left and right analog sound signals are supplied through amplifiers 11a and 11b to speakers 12a and 12b to produce sounds.

Figure 2:
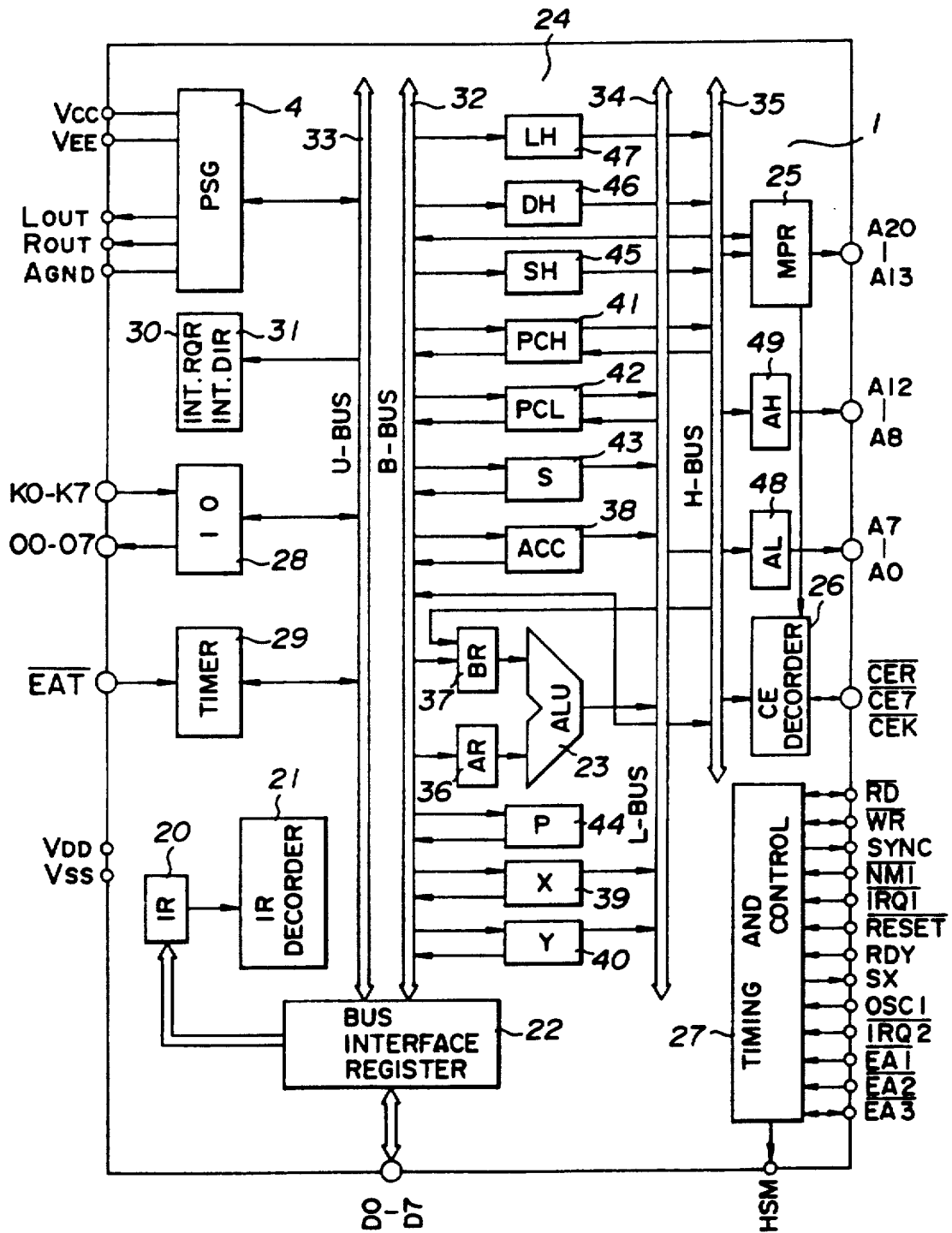
FIG. 2 is a block diagram showing an apparatus for controlling the transfer of data in an embodiment according to the invention.

FIG. 2 shows the CPU 1 and the programable sound generator 4 as encircled by a dotted line in FIG. 1. The CPU 1 in which an apparatus for controlling a transfer of data in the embodiment is included and comprises an instruction register 20, an instruction decoder 21, a bus interface register 22, an arithmetic and logic unit (ALU) 23, a set of registers 24, a mapping register 25, a chip enable decoder 26, a timing and control unit 27, an input and output port 28, a timer 29, an interrupt request register 30, an interrupt disable register 31, and so on. These units will be explained as follows.

(1) Instruction Register 20

The register 20 is loaded with an instruction code at an instruction fetch cycle.

(2) Instruction Decoder 21

The decoder 21 performs a sequential operation determined in accordance with an output of the instruction register 20, an interrupt input from a peripheral circuit or a reset input, and further performs a control of a branch command changing a flow of a program in accordance with informations of a status register described later.

(3) Bus Interface Register 22

The register 22 controls a transfer of data among a B-bus 32, a U-bus 33 and an external bus D0 to D7. The ALU 23 and the set of registers 24 are connected by the B-bus 22 and the U-bus 33, and is connected to internal peripheral circuits. Further, a L-bus 34 for transferring lower eight bits of a logical address and a H-bus 35 for transferring upper eight bits of the logical address are provided. A logical address low register 48 is connected to the L-bus 34, and a logical address high register 49 is connected to the H-bus 35.

(4) ALU 23

The ALU 23 is provided with an A register 36 and a B register 37, and performs all of arithmetic and logic operation. The A and B registers 36 and 37 are loaded with one or two data so that an arithmetic operation is performed in accordance with a control signal of the instruction decoder 21 to supply one of the B, L and H-buses 32, 34 and 35 with a result of the arithmetic operation.

(5) Set of Registers 24

The set of registers 24 comprises the following ten registers each being of eight bits.

(a) Accumulator 38

The accumulator 38 is a wide use register which plays the most important role in an arithmetic and logic operation to be conducted when a memory arithmetic flag T of a status register described later is "0". Data thereof is supplied to an input of the ALU 23, and a result of the arithmetic is stored therein. The accumulator 38 is also used for a transfer of data between memories and between a memory and a peripheral circuit, and for a count of a data block length when a block transfer of data is performed. A lower data of the length are stored therein after data stored therein are evacuated into a stack region of the RAM 6.

(b) X and Y Registers 39 and 40

The registers 39 and 40 are wide use registers which are mainly used for an index addressing. The X register 39 is used for a designation of an address on page "0" of a memory which is a destination of an arithmetic operation, and for a storage of lower data of a source address after data stored therein are evacuated into a stack region of the RAM 6 when a block transfer of data is performed. On the other hand, the Y register 40 stores lower data of a destination address after data stored therein at the very moment are evacuated into a stack region of the RAM 6 when a block transfer of data is performed.

(c) Program Counters 41 and 42

An up counter of sixteen bits is composed of the program counter 41 of upper eight bits and the program counter 42 of lower eight bits. The up counter is automatically incremented in accordance with the conduct of a command to designate an address of a command or operand to be next conducted. Contents of the counters 41 and 42 are evacuated into a stack region of the RAM 6 in a case where a command of subroutine is conducted, and an interrupt is produced, or after an interruption command of a software is conducted.

(d) Stack Pointer 43

The stack pointer 43 designates lower eight bits of the highest address on a stack region of the RAM 6, and is decremented after the pushing of data into the stack region and incremented before the pulling of the data from the stack region. For instance, two hundred fifty-six (256) bytes of addresses "2100" to "21FF" are allocated to the stack region in a logical address.

(e) Source High Register 45, Destination High Register 46, and Length High Register 47

These registers function in case of a command of a block transfer. The source high register 45 provides an upper byte of a source address to designate the source address together with a content of the X register 39. The destination high register 46 provides an upper byte of a destination address to designate the destination address together with a content of the Y register 40. The length high register 47 provides upper eight bits for a down counter together with a content of the accumulator 38 so that a length of a block transfer is counted by a byte unit.

(6) Mapping Register 25

The mapping register 25 is composed of eight registers each being of eight bits to convert a logical address of sixteen bits to a physical address of twenty-one bits, and is selected by upper three bits of the H bus 35.

(7) Chip Enable Decoder 26

The chip enable decoder 26 provides chip enable outputs for following peripheral circuits by decoding upper eleven bits of a physical address.

(a) a Chip Enable for the RAM 6 . . . $\overline{CER}$ (b) a Chip Enable for the Video Display Controller 2 . . . $\overline{CE7}$ (c) a Chip Enable for the Video Color Encoder 3 . . . $\overline{CEK}$ (d) a Chip Enable for the Programable Sound Generator 4 . . . $\overline{CEP}$ (e) a Chip Enable for the Timer 29 . . . $\overline{CET}$ (f) a Chip Enable for the Input and Output Port . . . $\overline{CEIO}$ (g) a Chip Enable for the Interrupt Request Register 30 and the Interrupt Disable Register 31 . . . $\overline{CECG}$

(8) Timing and Control Unit 27

The unit 27 is connected to following terminals.

(a) $\overline{RD}$ Terminal

A read timing signal is supplied through the RD terminal at a reading cycle.

(b) $\overline{WR}$ Terminal

A write timing signal is supplied through the WR terminal at a writing cycle.

(c) SYNC terminal

A synchronous signal of "high" is supplied through the SYNC terminal at an instruction fetch cycle, that of "low" is supplied therethrough at a system reset timing.

(d) $\overline{NMI}$ Terminal

A non-maskable interrupt is produced when $\overline{NMI}$ input signal is supplied through the NMI terminal. A sub-routine call is conducted by reading lower address from the logical address "FFFC" and upper address from the logical address "FFFD" when a command which is conducted in a program is completed.

(e) $\overline{IRQ1}$ and $\overline{IRQ2}$ Terminals

A sub-routine call is conducted by reading lower address from the logical address "FFF8" and upper address from the logical address "FFF9" when $\overline{IRQ1}$ input becomes "low" in a case where a corresponding bit in the interrupt disable register 31 is "0", and a corresponding bit in the status register 44 is "0". At this time, the corresponding bit is set in the status register 44, and other corresponding bits are reset therein.

A sub-routine call is conducted by reading lower address from the logical address "FFF6" and upper address from the logical address "FFF7" when $\overline{IRQ2}$ input becomes "low" in a case where a corresponding bit in the interrupt disable register 31 is "0", and a corresponding bit in the status register 44 is "0". At this time, the corresponding bit is set in the status register 44, and other corresponding bits are reset therein.

(f) $\overline{RESET}$ Terminal

A program is started by reading lower address from the physical address "001FFE" and upper address from the physical address "001FFF" when a $\overline{RESET}$ input becomes "low".

(g) RDY Terminal

The CPU 1 is started to operate when a RDY input is changed from "low" to "high".

(h) SX Terminal

A complementary signal of a system clock signal is supplied through the SX terminal.

(i) OSC1 Terminal

An external clock signal is input through the OSC1 terminal.

(j) $\overline{EA1}$ to $\overline{EA3}$ Terminals

These are input terminals for a test of the CPU 1.

(k) HSM Terminal

A speed signal of "high" is supplied through the HSM terminal in case of a high speed mode of 21.47727 MHz/3, and that of "low" is supplied therethrough in case of a low speed mode of 21.47727 MHz/12.

(9) Input and Output Port 28

The port 28 is connected to following terminals.

(a) K0 to K7 Terminals

The terminals are input ports from which data are written in accordance with the conduct of a reading cycle in regard to the physical addresses "1FF000" to "1FF3FF".

(b) $\overline{O0}$ to $\overline{O7}$ Terminals

The terminals are output ports with latches to which data are supplied in accordance with the conduct of a writing cycle in regard to the physical addresses "1FF000" to "1FF3FF".

(10) Timer 29

The timer 29 is connected to a test input terminal $\overline{EAT}$ for the CPU 1 and provides a timer signal through the U-bus thereto.

(11) Interrupt Request Register 30

The register 30 is of eight bits among which five bits are not used, while the remaining two bits are "1" to show the $\overline{IRQ1}$ to $\overline{IRQ2}$ terminals "low" and the remaining one bit is "1" to show a timer interrupt caused. The register 30 is only used for "read".

(12) Interrupt Disable Register 31

The register 31 is of eight bits among which five bits are not used, while the remaining two bits are "0" to show an interrupt request of the $\overline{IRQ1}$ and $\overline{IRQ2}$ terminals disable, and the remaining one is "0" to show an interrupt request disable in accordance with the timer interrupt.

In FIG. 3, there is shown the aforementioned mapping register 25 comprising eight registers MPR0 to MPR7 each being of eight bits, and connected through the B-bus 32 to an input output controller 50 and through an output selector 51 to the output terminals A13 to A20. The output selector 51 selects one register from the eight registers MPR0 to MPR7 of the mapping register 25 in accordance with upper three bits H5 to H7 of upper data of a logical address on the H-bus 35.

FIG. 4 shows a relation between the upper three bits H5 to H7 and one register selected from the eight registers MPR0 to MPR7. If it is assumed that the upper three bits H5 to H7 are "010", the register MPR2 is selected from the eight registers MPR0 to MPR7. Data are read from the mapping register 25 by a command "TMAi" where "i" is an integer selected from "0" to "7". For instance, data are read from the register MPR2 to be transferred through the B-bus 32 to the accumulator 38 in accordance with a command "TMA$_2$". On the other hand, data are written into the mapping register 25 by a command "TAMi" where "i" is an integer selected from "0" to "7". For instance, data are transferred to be written into the register MPR0 from the accumulator 38 by a command "TAM$_0$". The commands "TMAi" and "TAMi" are composed of two byte respectively, and lower byte thereof includes a bit of "1" corresponding in a bit number to a register number which is selected from the eight registers MPR0 to MPR7 and remaining seven bits of "0". When one of the eight registers MPR0 to MPR7 is selected in accordance with upper three bits of the H-bus 35, a content of the selected register is supplied through the output terminals A13 to A20 to a following stage so that a physical address of twenty-one bit is obtained together with a content of the logical address low register 48 to be supplied through the output terminals A0 to A7 thereto, and lower five bits of the logical address high register 49 to be supplied through the output terminals A8 to A12 thereto. When the most significant bit A20 of a physical address A0 to A20 is "1", a command by which data designated in accordance with the physical address A0 to A20 are immediate-transferred to the video display controller 2 is conducted. The command includes ST0, ST1 and ST2 by which codes are produced on A0 and A1 of the address bus at a write cycle as shown in FIG. 6. The command is set in the instruction register 20.

In operation, lower data of a logical address are set in the logical address low register 48, and lower five bits of upper data of the logical address are set in the logical address high register 49. Here, it is assumed that address data are set in the eight registers MPR0 to MPR7 of the mapping register 25 respectively. When upper three bits of upper data of the logical address, that is to say, upper three bits H5 to H7 of the H-bus 35 are "001", the register MPR1 is selected so that a content "F8" of the register MPR1 is supplied through the output terminals A13 to A20 to the following stage. These output signals are combined with output signals of the output terminals A8 to A12 and A0 to A7 to produce a physical address A0 to A20. Then, the chip enable decoder 26 decodes upper eleven bits A10 to A20 of the physical address A0 to A20 to produce a chip enable signal $\overline{CER}$ of "0" by which a data memory is enabled.

Figure 7:
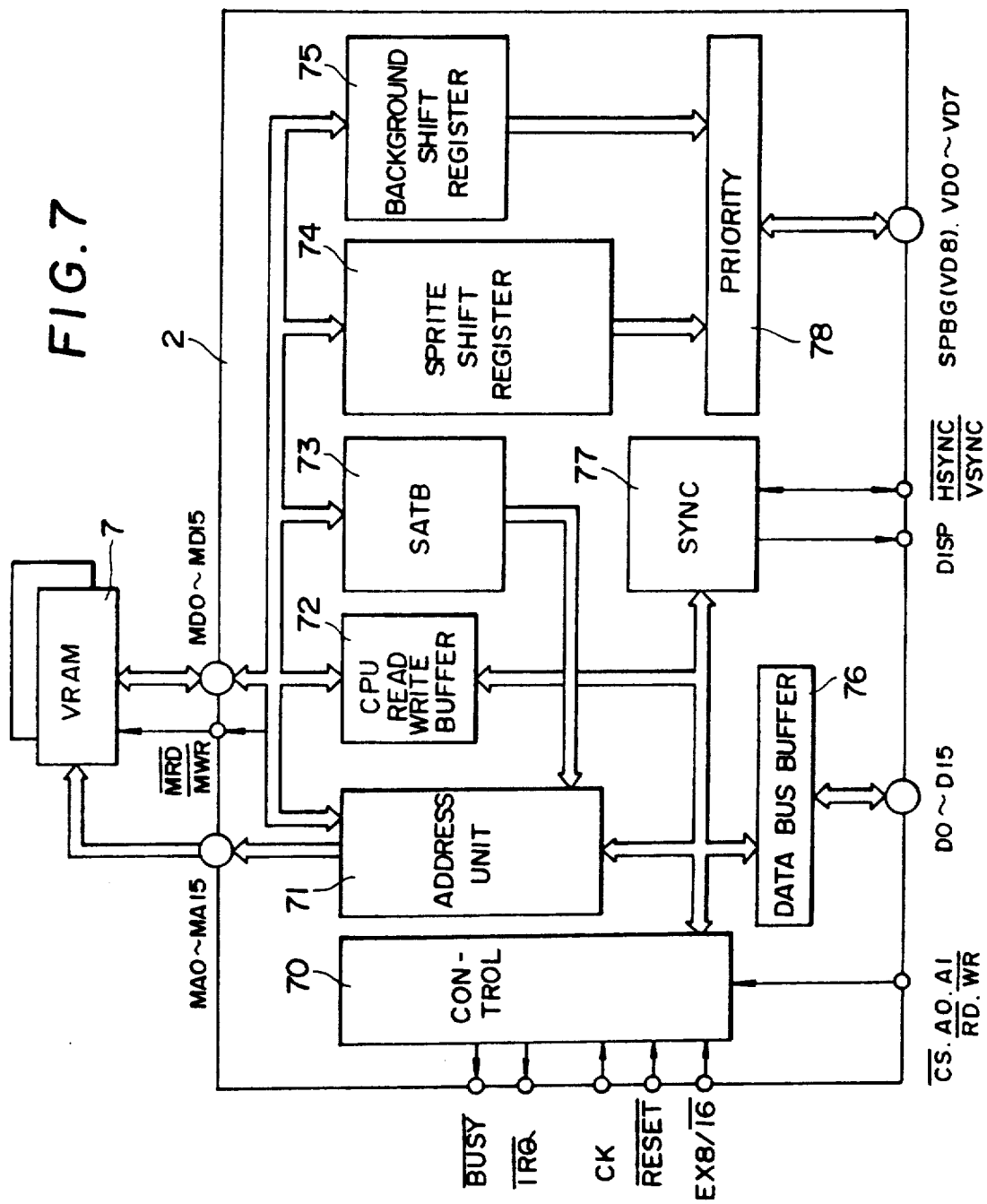
FIG. 7 is a block diagram showing the video display controller in the apparatus for displaying a color image.

When the immediate data transfer command is produced, the signal $\overline{CE7}$ is "0", the MSB A20 is "1", and the bits A0 and A1 are of a content as shown in FIG. 6 so that data are transferred from the CPU 1 to the video display controller 2 as shown in detail in FIG. 7.

FIG. 7 shows the video display controller 2 which comprises a control unit 70, an address unit 71, a CPU read/write buffer 72, a sprite attribute table buffer 73, a sprite attribute shift register 74, a background shift register 75, a data bus buffer 76, a synchronous circuit 77, and a priority circuit 78.

The control unit 70 is provided with a $\overline{BUSY}$ terminal through which "0" is supplied to the CPU 1 in a case where the video display controller 2 is not in time for the writing / reading of data from the CPU 1 to the VRAM 7 so that the CPU 1 is held under the state, a $\overline{IRQ}$ terminal through which an interrupt request signal is supplied to an external circuit, a CK terminal through which a clock signals having a frequency for one dot (one picture element) is received, a $\overline{RESET}$ terminal through which a reset signal for initiallization is received, and a EX8/$\overline{16}$ terminal through which a data bus change-over signal for changing over a data bus width is received.

The address unit 71 is connected to address terminals MA0 to MA15 through which an address signal of the VRAM is supplied thereto. An address region of the VRAM 7 is of a capacity, for instance, 65,536 words, provided that one word is of sixteen bits. The address unit 71, the CPU read / write buffer 72, the sprite attribute table 73, the sprite shift register 74 and the background shift register 75 are connected through data bus to data terminals MD0 to MD15 through which data of the VRAM 7 are transferred for the writing thereinto or the reading therefrom.

The sprite attribute table buffer 73 is a memory for storing a display position (X, Y), color, pattern number and so on of a sprite (16×16 bits).

The sprite shift register 74 is supplied with a pattern number, sprite color etc. read from the sprite attribute table buffer 73 to access the VRAM 7, and stores data for a pattern, color etc. of a sprite read from a sprite generator in the VRAM 7.

The background shift register 75 stores a pattern and CG color of a background. The pattern is read from a character generator in accordance with an address of the character generator in the VRAM 7 obtained from a character code which is read from an attribute table in the VRAM 7 together with the CG color.

The data bus buffer 76 is connected to terminals D0 to D15 through which data are supplied to and received from an external circuit. The video display controller 2 can select one of eight bit interface and sixteen bit interface in compliance with a data width of a system including the CPU 1. When the eight bit interface is selected, the terminals D0 to D7 are used among the terminals D0 to D15.

The synchronous circuit 77 is connected to a DISP terminal through which a signal for indicating a display period is supplied to an external circuit, a $\overline{VSYNC}$ terminal through which a signal for a vertical synchronism of a CRT is supplied to the television set 9 and an external vertical synchronous signal is received, and a $\overline{HSYNC}$ terminal through which a signal for a horizontal synchronism of the CRT is supplied to the television set 9 and an external horizontal synchronous signal is received.

The priority circuit 78 is connected to terminals VD0 to VD7 through which video data are supplied to an external circuit, and a SPBG (VD8) terminal through which a signal "1" is supplied to an external circuit when the video data are for a sprite and a signal "0" is supplied thereto when the video data are for a background.

The aforementioned control unit 70 is further provided with a $\overline{CS}$ terminal through which a signal "0" is received so that registers therein are accessed for the writing and reading of data from the CPU 1, $\overline{RD}$ and $\overline{WR}$ terminals through which read write-timing signals are received, and terminals A0 and A1 connected to the address bus of the CPU 1 as shown in FIG. 2.

The video display controller 2 is further provided with a $\overline{MRD}$ terminal and a $\overline{MWR}$ terminal. When the $\overline{MRD}$ terminal is under a state of "0", data are read from the VRAM 7 to the CPU 1. On the other hand, when the $\overline{MWR}$ terminal is under a state of "0", data are written into the VRAM 7 from the CPU 1.

The control unit 70 includes a memory address write register and a VRAM data write register together with other registers.

In operation, when an immediate data transfer command (ST0, ST1 or ST2) is produced, data transferred from the CPU 1 are stored in the VRAM data write register. The aforementioned physical address A0 to A20 is automatically set in the memory address write register without receiving an address setting command. As a result, the data are written into the VRAM 7 in synchronism with a write signal of "0" applied to the $\overline{WR}$ terminal in accordance with a single transfer command which is called "an immediate data transfer command".

That is to say, a chip including the aforementioned memory address write register and VRAM data write register is enabled in accordance with a chip enable signal $\overline{CE7}$ which becomes "0" in the conduct of the immediate data transfer command of ST0, ST1 or ST2. As a result, bits A0 and A1 of a physical address A0 to A20 of twenty-one bits becomes a bit state dependent on the command (ST0, ST1 or ST2). Accordingly, the data transferred from the CPU 1 are automatically stored in the VRAM 7 without the necessity that an address is set in the memory address write register by a command.

Figure 8:
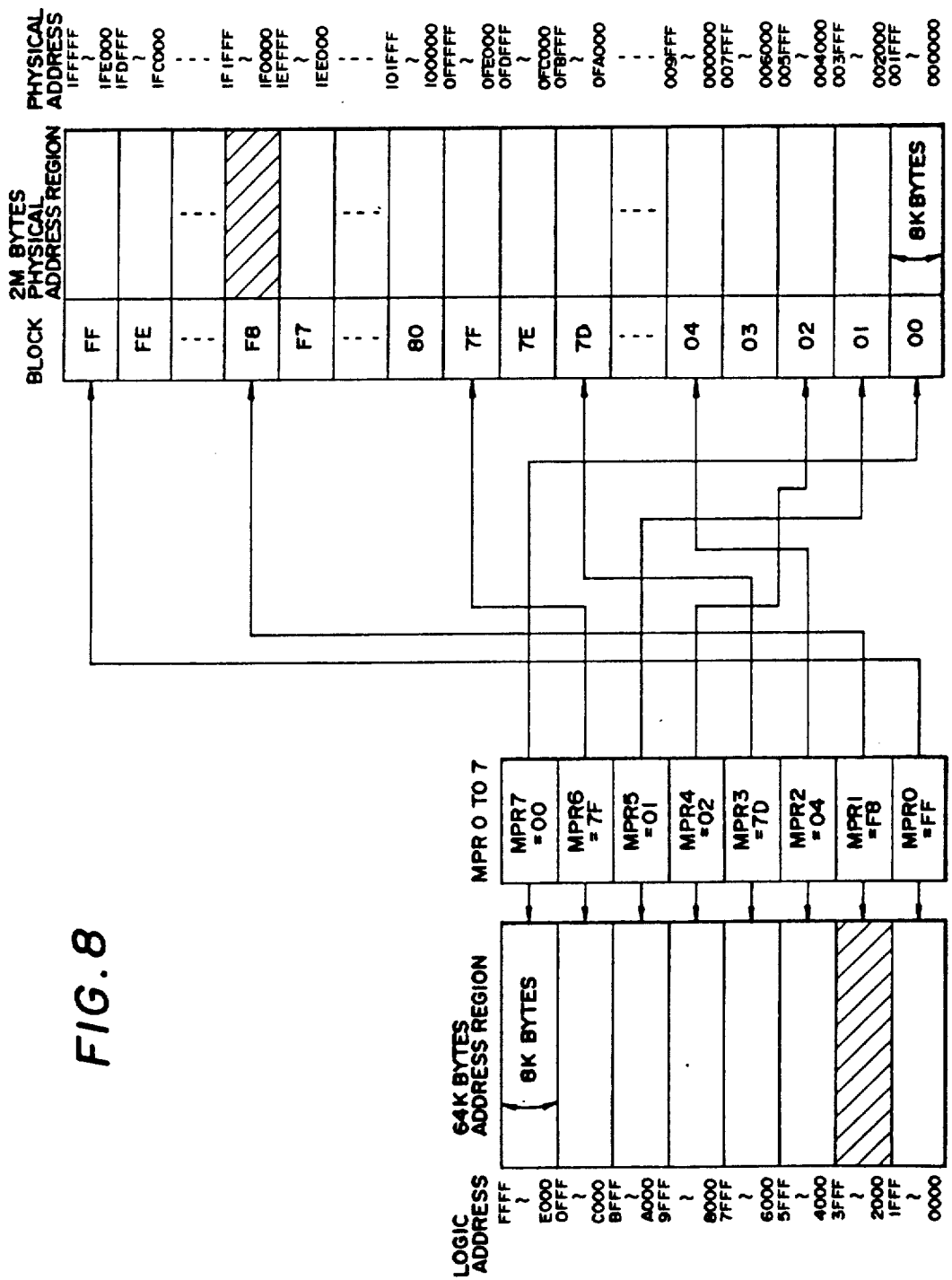
FIG. 8 is an explanatory diagram showing a relation between logical and physical address regions in an apparatus for controlling the transfer of data in the embodiment.

FIG. 8 shows a relation between a logical address of the CPU 1 and a physical address of the RAM 6 wherein a block "F8" of a physical address region having 2M bytes is allocated in accordance with a content "F8" of the selected register MPR1 in a case where a logical address of sixteen bits on the L and H-buses 34 and 35 corresponds to one address selected from addresses 2000 to 3FFF of a logical address region having 64K bytes as indicated by hatching lines therein. Thus, a memory of 2M bytes in which an address signal of twenty-one bits is required for the access thereof can be accessed by an address signal of sixteen bits. At this time, data at a corresponding address of a memory are immediate-transferred to a video display controller 2 in a case where lower two bits A0 and A1 of the physical address are of a content as shown in FIG. 6.

Figure 9:
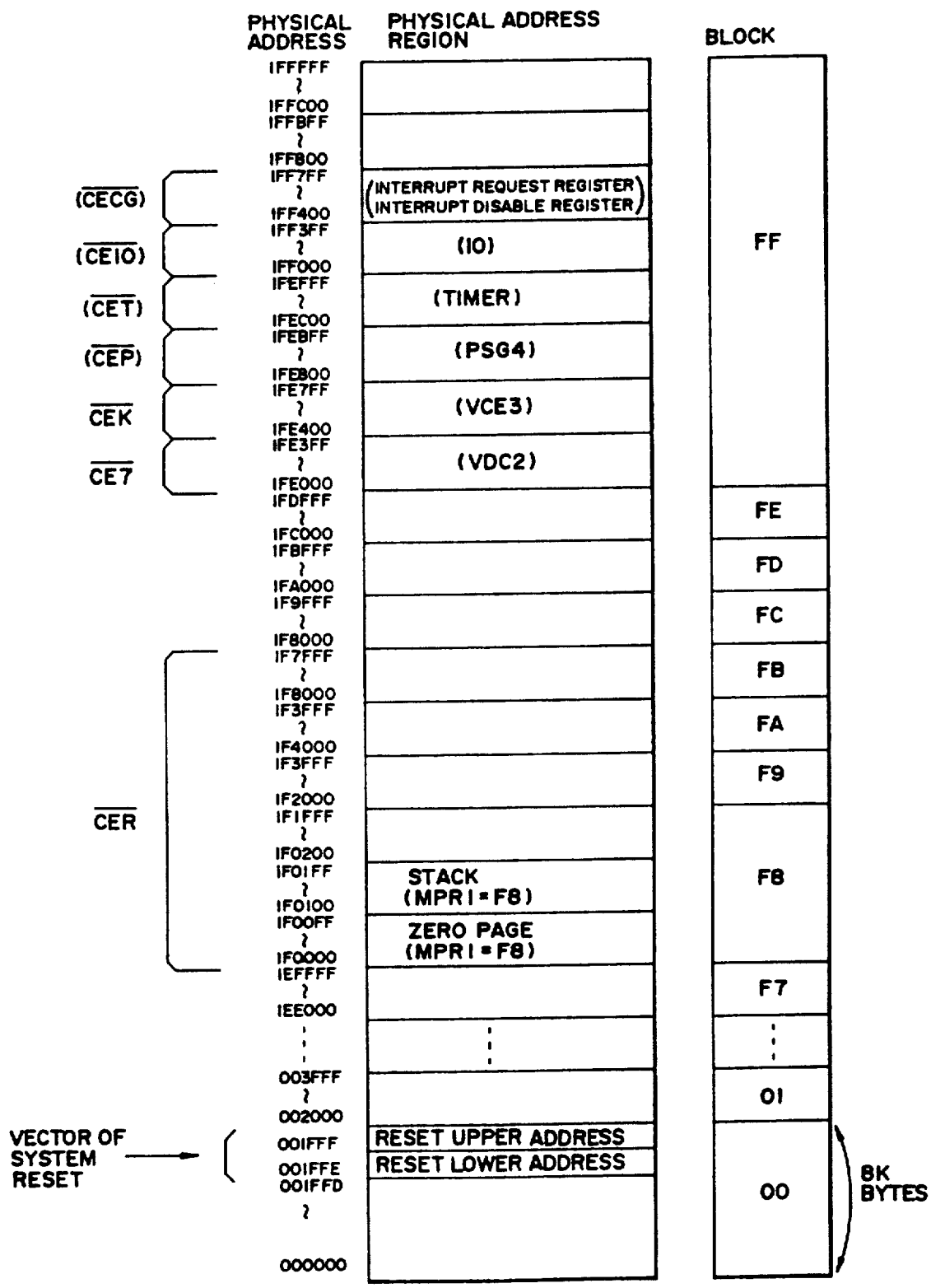
FIG. 9 is an explanatory diagram showing an allocation of a chip enable signal to a physical address region in an apparatus for controlling the transfer of data in the embodiment.

FIG. 9 shows a physical address region of the RAM 6 to which a chip enable signal CER is allocated. The chip enable signal CER is produced in accordance with a content of upper eleven bits A10 to A20 of a physical address A0 to A20 which is decoded in the chip enable decoder 26. For instance, the chip enable signal CER is allocated to a region of physical addresses 1F0000 to 1F7FFF in which zero page and stack regions exist in a case where a content of the selected register MPR1 is "F8". The zero page and stack regions are of a region to which contents of the accumulator 38, the X register 39, and the Y register 40 are evacuated temporarily.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. In an apparatus including a central processing unit, a VRAM, a mapping register, a first eight bit bus line connected to a logical address low register, a second eight bit bus line connected to a logical address high register and said mapping register, a third bus line connected to said mapping register, and twenty-one address terminals A0 to A20, said CPU supplying a sixteen bit logical address via said first and second eight bit bus lines, said first bus line carrying the lower eight bits of the logical address and said second bus line carrying the higher eight bits of the logical address, a method for supplying a twenty-one bit physical address via said twenty-one address terminals utilizing said sixteen bit logical address for writing data to said VRAM from said CPU comprising the steps of:

supplying eight bits of said twenty-one bit physical address to eight address terminals A20 to A13 via said mapping register, supplying another eight bits of said twenty-one bit physical address to eight address terminals A0 to A7 via said logical address low register, and supplying five bits of said twenty-one bit physical address to address terminals A8 to A12 via said logical address high register, wherein the most significant bit of the twenty-one bit physical address directs immediate transfer of data from said CPU to said VRAM.

2. The method according to claim 1, wherein the two lowest significant bits of the twenty-one bit physical address direct storing said data in a data write register of said VRAM and transferring said data from said VRAM data write register to said VRAM into which the data are written.

* * * * *